United States Patent [19]
Smith

[11] Patent Number: 4,550,921
[45] Date of Patent: Nov. 5, 1985

[54] RING JOINT GASKET

[76] Inventor: Arnold M. Smith, 13023 Liggett St., Norwalk, Calif. 90650

[21] Appl. No.: 588,372

[22] Filed: Mar. 12, 1984

[51] Int. Cl.[4] .............................................. F16L 23/00
[52] U.S. Cl. ................................. 277/167.5; 277/190; 277/236
[58] Field of Search ................... 277/167.3, 167.5, 190, 277/191, 236

[56] References Cited
U.S. PATENT DOCUMENTS
1,483,499  2/1924  Allee ................................ 277/167.5
4,214,763  10/1978  Latham ........................... 277/167.5

*Primary Examiner*—Robert I. Smith
*Attorney, Agent, or Firm*—Edgar W. Averill, Jr

[57] ABSTRACT

A ring joint gasket for sealing a pair of flanges in a pipe. The gasket fits in a pair of grooves in the flanges and permits the flanges to have face to face contact. The grooves deflect the gasket and create a tight seal to prevent the leakage of process materials from inside the pipe.

7 Claims, 6 Drawing Figures

4,550,921

RING JOINT GASKET

BACKGROUND OF THE DISCLOSURE

The field of the invention is pipe fittings and the invention relates more particularly to ring joint gaskets of the type used between pairs of mating flanges in pipe lines capable of withstanding high pressure.

The typical ring joint gasket fits in a pair of grooves formed in the flange faces. Most grooves have two angled sides and a flat bottom and most gaskets have an octagonal cross section. In some joints the grooves are oval. The gaskets fit in the grooves but generally are of sufficient size so that the faces of the two mating flanges are held apart.

In the use of the above-mentioned gasket, leakage of process materials from within the pipe could occur if the flanges become slightly misaligned. This results from the deformation of the prior art gasket since the gasket must take the full load in that the flange faces do not touch. Furthermore if the gasket is not properly aligned, the gasket occasionally will seal on one side but not on the other and result in a process materials leak. Prior art gaskets utilizing face-to-face contact have not provided sufficient sealing due to their design requiring equal seating on the inside level and outside level simultaneously on both faces.

SUMMARY OF THE INVENTION

It is thus an object of the present invention to provide a ring joint gasket which provides greater reliability and ability to withstand a bending load.

The present invention is for a ring joint gasket and flange assembly for sealing the joint between two flanges. The assembly has a lower flange having a planar face with a groove formed therein. The groove has a flat inner surface, a flat bottom and a flat outer surface. The inner and outer surfaces are formed at an angle of about twenty-three degrees with respect to the vertical and the bottom surface is about parallel to the face of the flange. An upper flange has a planar face abutting the planar face of the lower flange and having a groove formed therein. The groove in the upper flange is adjacent to the groove in the lower flange and has a flat inner surface, a flat bottom and a flat outer surface. The inner and outer surfaces are formed at an angle of about twenty-three degrees with respect to the vertical and the bottom surface is also about parallel to the face of the flange. A metallic ring joint gasket is wedged in the groove of the lower flange and in the groove of the upper flange. The ring joint gasket has two angled outer faces which faces are formed at an angle slightly less than that of the outer surfaces of the grooves when the ring joint gasket is in a relaxed configuration. The ring joint gasket has flat top and bottom surfaces and has a generally flat and generally vertical inner surface which inner surface is deflected in a slightly concave manner by the force of the of the grooves which hold the gasket in place. The upper flange has a planar face which abuts the planar face of the lower flange. Preferably, the ring joint gasket has an outer face angle of from between nineteen to twenty-two degrees in its relaxed configuration.

DESCRIPTION OF THE PREFERRED EMBODIMENTS

Figure 1:
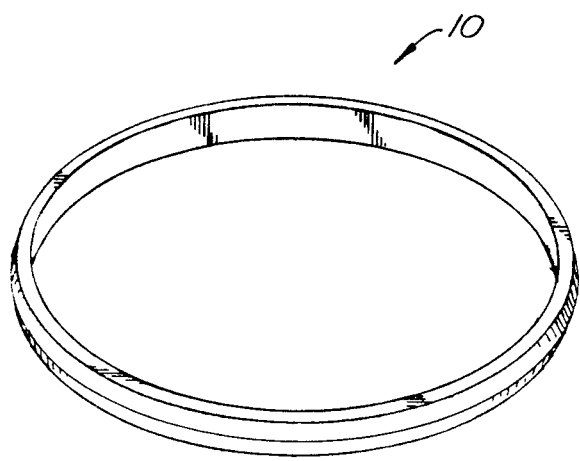
FIG. 1 is a perspective view of the ring joint gasket of the assembly of the present invention.

The ring joint gasket of the present invention is shown in FIG. 1 and indicated generally by reference character 10. The gasket is formed from malleable iron or other suitable material having similar properties. For purposes of describing and claiming the present invention it is believed useful to refer to the ring joint gasket and flange assembly in a vertical position such as that shown in FIG. 2 of the drawings. It is to be understood, however, that the gasket need not be oriented as shown in the drawings and, of course, works without regard to orientation.

Figure 2:
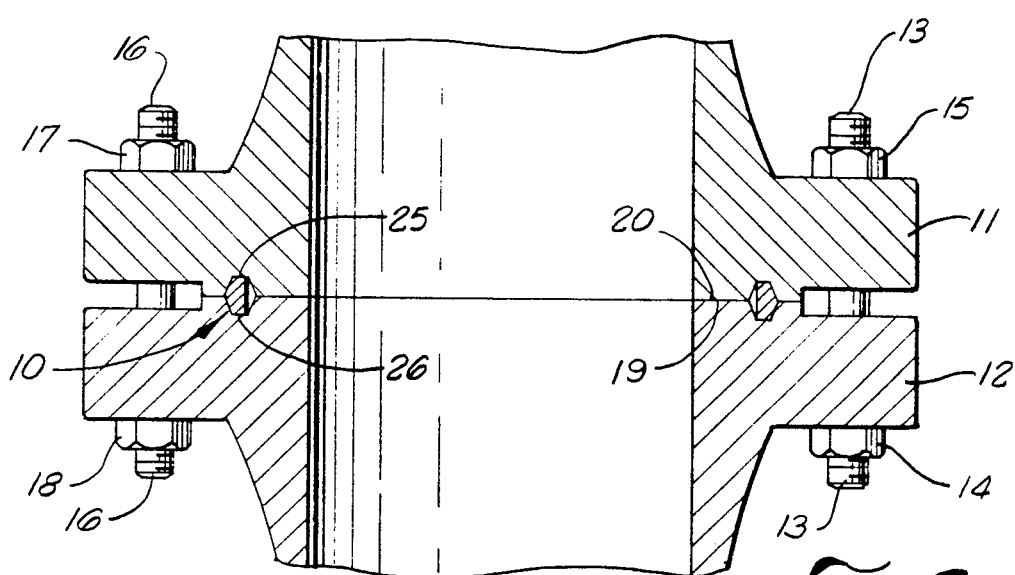
FIG. 2 is a cross-sectional side elevation of the ring joint and flange assembly of the present invention.

In FIG. 2, an upper flange 11 is held to a lower flange 12 by a plurality of studs such as studs 13 and 16. Stud 13 is secured by bolts 14 and 15, and stud 16 is likewise secured by bolts 17 and 18. It can be seen that gasket 10 is of a size small enough to permit the lower surface 19 of upper flange 11 to be tightened directly against the upper surface 20 of lower flange 12. In this way, it is not possible for ring joint gasket 10 to be deformed by any bending force between upper flange 11 and lower flange 12 since the flange faces provide complete support and remove any additional force from gasket 10.

Figure 4:
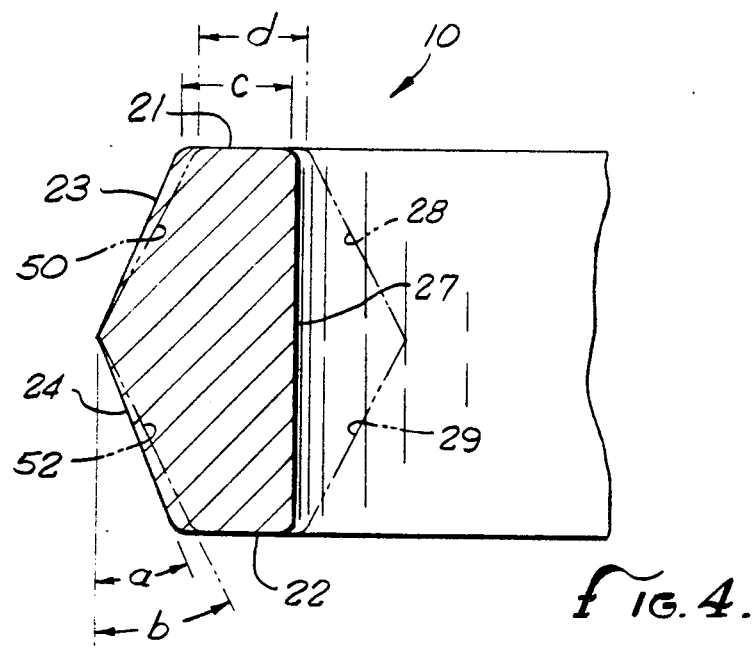
FIG. 4 is an enlarged cross-sectional view of the ring joint gasket of the assembly of the present invention.
Figure 5:
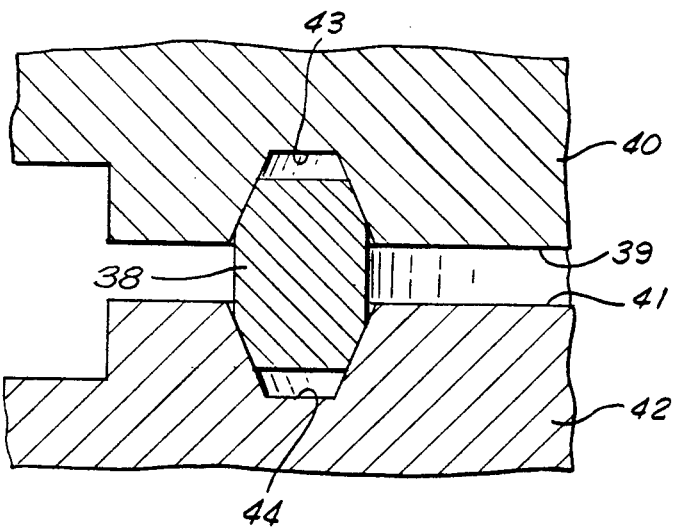
FIG. 5 is an enlarged cross-sectional elevation of the prior art ring joint gasket and flange assembly.

A cross-sectional view of gasket 10 is shown in FIG. 4 where it can be seen that gasket 10 has a flat top surface 21 and a flat bottom surface 22. Gasket 10 also has an upper angled outer face 23 and a lower angled outer face 24. Gasket 10 is shown in its relaxed configuration outside of the grooves of flanges 11 and 12 and the angle of angled faces 23 and 24 should be several degrees less than this same angle after the gasket is tightened in the grooves of the flanges. The relaxed angle is indicated by the letter "a" and the deformed angle is indicated by "b." Angle "b" is typically twenty-three degrees and angle "a" should be between about nineteen and twenty-two degrees and preferably about twenty degrees so that it is deformed by the pressure exerted against it by the upper and lower grooves 25 and 26. The angle of the inner and outer surfaces of the upper and lower grooves is typically twenty-three degrees and thus gasket 10 is deflected with its top and bottom surfaces being forced slightly inwardly with respect to the center thereof. This places a continual force against the groove surfaces by the gasket assuring a tight seal. The inner surface 27 of gasket 10 of FIG. 4 is formed away from the inner faces 28 and 29 of grooves 25 and 26 which are shown in phantom lines in FIG. 4. In this way, there is room between gasket 10 and the inner faces 28 and 29 of the groove for deformation of the gasket so that the flange faces can be brought into contact with one another. It should be noted that the width of the top surface 21 which is indicated by the letter "c" is about the same as the width "d" of the groove. As shown in FIG. 4, the corners of the gasket are preferably slightly rounded.

Figure 3:
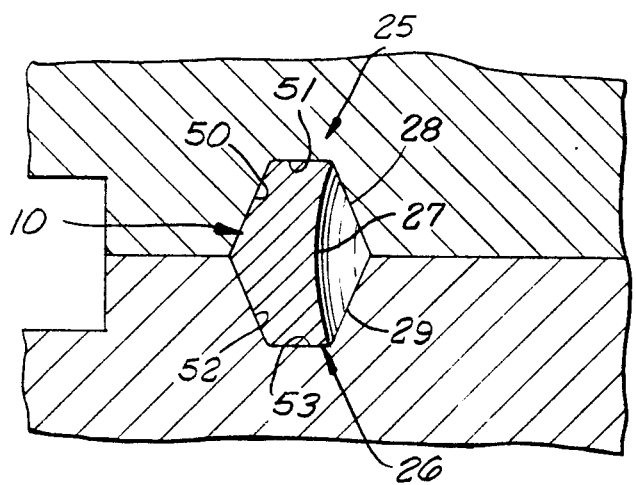
FIG. 3 is an enlarged cross-sectional view showing the ring joint gasket of the present invention and a portion of the flanges which hold it in place.

The deformed gasket is shown in exaggerated view in FIG. 3 where it can be seen that the inner surface 27 is deformed in a slightly concave manner by the force of the grooves. Upper groove 25 has an outer face 50 and a top 51, both of which closely conform to the installed gasket 10. Similarly outer face 52 of lower groove 26 and bottom 53 of the lower groove 26 closely conform to the respective surface of gasket 10. This results in a continued pressure resulting from the natural elasticity of the malleable iron from which such gaskets are preferably formed.

Figure 6:
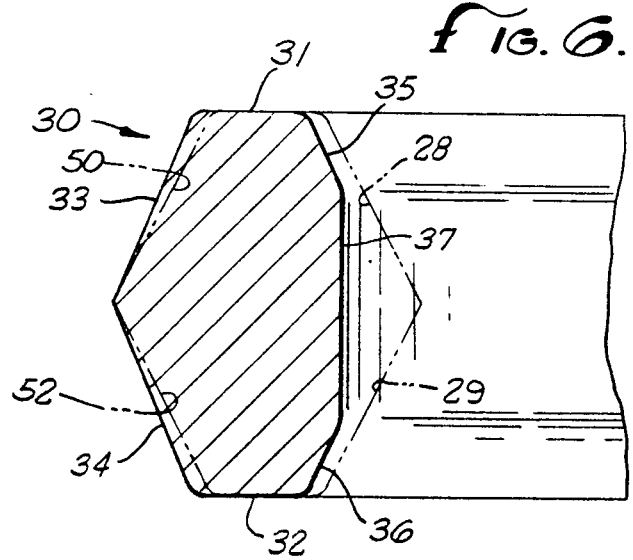
FIG. 6 is an enlarged cross-sectional view of an alternate configuration of the ring joint gasket of the assembly of the present invention.

An alternate configuration of the gasket is shown in FIG. 6 and indicated generally by reference character 30. Gasket 30 has a top surface 31, a bottom surface 32, an upper angled outer face 33, a lower angled outer face 34 and an inner surface 37. In addition, there is an upper angled inner face 35 and a lower angled inner face 36. The space between inner surface 37 and the inner faces of the grooves in which it is to be placed is sufficient to permit the deformation required for a continuous seal.

In contrast, the prior art gasket which is indicated by reference character 38 is of such a size that the flange face 39 of flange 40 does not touch the flange face 41 of flange 42 even after tightening of the bolts which hold the flanges together. Thus, gasket 38 is wedged in grooves 43 and 44 and the entire weight between the two flanges is held by gasket 38. In this way, a bending load, if of sufficient force, is capable of permanently deforming gasket 38 resulting in a fluid leak at the point of the gasket furthest away from the maximum pressure. The present invention eliminates such possibility by carrying any bending load directly on the flange faces which are capable of supporting any load that the bolts and studs can carry.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A ring joint gasket and flange assembly for sealing the joint between two flanges comprising:

a lower flange having a planar face with a groove formed therein, said groove having a flat inner surface, a flat bottom and a flat outer surface, said inner and outer surfaces being formed at an angle of about 23 degrees with respect to the vertical and the bottom surface being about parallel to the face of the flange;

an upper flange having a planar face abutting the planar face of the lower flange and having a groove formed therein, said groove being adjacent the groove in the lower flange and having a flat inner surface, a flat bottom and a flat outer surface, said inner and outer surfaces being formed at an angle of about 23 degrees with respect to the vertical and the bottom surface being about parallel to the face of the flange; and a metallic ring joint gasket wedged in said groove of said lower flange and said groove of said upper flange, said ring joint gasket having two angled outer faces which faces are formed at an angle slightly less than that of the outer surfaces of the grooves when said ring joint gasket is in a relaxed configuration and said ring joint gasket having flat top and bottom surfaces which top and bottom surfaces abut said bottom surfaces of the grooves in the upper and lower flanges when the face of the upper flange abuts the face of the lower flange, and said gasket having a generally flat and generally vertical inner surface which inner surface is deflected in a slight concave manner by the force of the grooves which hold the gasket in place.

2. The ring joint gasket and flange assembly of claim 1 wherein said ring joint gasket has slightly rounded corners.

3. The ring joint gasket and flange assembly of claim 1 wherein the generally flat and generally vertical inner surface intersects the flat top and bottom surfaces of said gasket.

4. The ring joint gasket and flange assembly of claim 1 further including a pair of angled inner faces between the generally flat and generally vertical inner surface and the flat top and bottom surfaces of said gasket.

5. The ring joint gasket and flange assembly of claim 4 wherein the angle of each of the angled inner faces is about 20 degrees with respect to the vertical.

6. The ring joint gasket and flange assembly of claim 1 wherein the angled outer faces of said ring joint gasket are at an angle of from 19 to 22 degrees with respect to the vertical when said ring joint gasket is in a relaxed configuration.

7. The ring joint gasket and flange assembly of claim 6 wherein the angled outer faces of said ring joint gasket are at an angle of about 20 degrees with respect to the vertical when said ring joint gasket is in a relaxed configuration.

* * * * *